United States Patent
Joe et al.

(10) Patent No.: US 9,995,165 B2
(45) Date of Patent: *Jun. 12, 2018

(54) BLADE OUTER AIR SEAL HAVING PARTIAL COATING

(71) Applicant: United Technologies Corporation, Hartford, CT (US)

(72) Inventors: Christopher R. Joe, Wethersfield, CT (US); Paul M. Lutjen, Kennebunkport, ME (US); Dominic J. Mongillo, Jr., West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/735,415

(22) Filed: Jun. 10, 2015

(65) Prior Publication Data

US 2016/0047264 A1 Feb. 18, 2016

Related U.S. Application Data

(63) Continuation-in-part of application No. 13/183,891, filed on Jul. 15, 2011, now Pat. No. 9,062,558.

(51) Int. Cl.
*F01D 11/12* (2006.01)
*F01D 11/08* (2006.01)

(52) U.S. Cl.
CPC .......... *F01D 11/08* (2013.01); *F05D 2230/90* (2013.01); *F05D 2250/292* (2013.01); *F05D 2260/202* (2013.01); *Y02T 50/676* (2013.01)

(58) Field of Classification Search
CPC .......... F01D 11/02; F01D 11/08; F01D 11/12; F01D 11/122
See application file for complete search history.

(56) References Cited

U.S. PATENT DOCUMENTS 3,365,172 A * 1/1968 Howald ................. F01D 11/08
277/414
4,337,016 A 6/1982 Chaplin
(Continued)

FOREIGN PATENT DOCUMENTS

DE 19619438 11/1997
EP 1965033 9/2008
(Continued)

OTHER PUBLICATIONS

The European Search Report for European Application No. 12175296.8, dated Jul. 16, 2014.
(Continued)

*Primary Examiner* — Justin Seabe
(74) *Attorney, Agent, or Firm* — Carlson, Gaskey & Olds, P.C.

(57) ABSTRACT

A blade outer air seal member includes a distinct body that has two circumferential sides, a leading edge and a trailing edge, and a gas path side and a radially outer side opposite the gas path side. A ceramic coating is initially disposed on a portion of the gas path side. The ceramic coating includes a forward coating portion and an aft coating portion. The gas path side has a bare area axially separating the forward coating portion and the aft coating portion. The bare area excludes any of the ceramic coating. One or more cooling passages have an outlet that opens at the bare area. The cooling passage extends in the body in an axial direction under the ceramic coating.

19 Claims, 3 Drawing Sheets

(56) References Cited

U.S. PATENT DOCUMENTS

| | | | |
|---|---|---|---|
| 4,422,648 | A | 12/1983 | Eaton et al. |
| 4,497,610 | A | 2/1985 | Richardson et al. |
| 4,551,064 | A | 11/1985 | Pask |
| 5,165,847 | A | 11/1992 | Proctor et al. |
| 5,282,718 | A | 2/1994 | Koff et al. |
| 5,308,225 | A | 5/1994 | Koff et al. |
| 5,439,348 | A | 8/1995 | Hughes et al. |
| 6,196,792 | B1 | 3/2001 | Lee et al. |
| 6,264,425 | B1 | 7/2001 | Keller |
| 6,670,046 | B1 * | 12/2003 | Xia .................... C23C 4/00 416/229 A |
| 6,726,448 | B2 | 4/2004 | McGrath et al. |
| 6,887,529 | B2 | 5/2005 | Borneman et al. |
| 6,905,302 | B2 | 6/2005 | Lee et al. |
| 7,008,183 | B2 | 3/2006 | Sayegh et al. |
| 7,726,936 | B2 | 6/2010 | Keller et al. |
| 2009/0067994 | A1 | 3/2009 | Pietraszkiewicz et al. |
| 2009/0110536 | A1 | 3/2009 | Strock et al. |
| 2010/0104426 | A1 | 4/2010 | Keller et al. |
| 2013/0323032 | A1 | 12/2013 | Lutjen |

FOREIGN PATENT DOCUMENTS

| | | |
|---|---|---|
| EP | 2065566 | 6/2009 |
| EP | 2535522 | 12/2012 |
| EP | 2546463 | 1/2013 |

OTHER PUBLICATIONS

European Search Report for European Patent Application No. 16173981 completed Sep. 30, 2016.

* cited by examiner

BLADE OUTER AIR SEAL HAVING PARTIAL COATING

CROSS-REFERENCE TO RELATED APPLICATION

The present application is a continuation-in-part of U.S. patent application Ser. No. 13/183,891 filed Jul. 15, 2011.

STATEMENT REGARDING FEDERALLY SPONSORED RESEARCH OR DEVELOPMENT

This invention was made with government support under contract numbers F33615-95-C-2503 and F33615-97-C-2779 awarded by the United States Air Force. The government has certain rights in the invention.

BACKGROUND

This disclosure relates to seals and, more particularly, to a blade outer air seal member for a gas turbine engine.

Conventional gas turbine engines are widely known and used as ground-based turbines for energy production or for propelling aircraft or other vehicles. Typically, a gas turbine engine includes a compressor section, a combustor section, and a turbine section that cooperate in the combustion of fuel to expand combustion gases over the turbine section in a known manner.

A blade outer air seal is located radially outwards from the turbine section and functions as an outer wall for the hot gas flow through the turbine section. Due to large pressures and the contact with the hot gas flow, the blade outer air seal is made of a strong, oxidation-resistant metal alloy and requires a cooling system to keep the alloy below a certain temperature. For example, relatively cool air is taken from an air flow through the engine (e.g., compressor) and routed through an intricate system of cooling passages in the seal to maintain a desirable seal temperature. The gas path surface of the blade outer air seal may include a thermal, environmental or corrosion resistance coating system to help protect the underlying metal alloy.

SUMMARY

A blade outer air seal member according to an example of the present disclosure includes a distinct body that has two circumferential sides, a leading edge and a trailing edge, and a gas path side and a radially outer side opposite the gas path side. A ceramic coating is initially disposed on a portion of the gas path side. The ceramic coating includes a forward coating portion and an aft coating portion. The gas path side has a bare area axially separating the forward coating portion and the aft coating portion. The bare area excludes any of the ceramic coating. A cooling passage has an outlet that opens at the bare area. The cooling passage extends in the distinct body in an axial direction under the ceramic coating.

In a further embodiment of any of the forgoing embodiments, the at least one cooling passage includes an inlet that opens at the radially outer side.

In a further embodiment of any of the forgoing embodiments, the inlet is axially offset from the outlet.

In a further embodiment of any of the forgoing embodiments, the inlet is axially forward of the outlet with respect to the leading edge.

In a further embodiment of any of the forgoing embodiments, the outlet is located closer to the forward coating portion than to the aft coating portion.

In a further embodiment of any of the forgoing embodiments, the body is monolithic.

In a further embodiment of any of the forgoing embodiments, the at least one cooling passage radially slopes.

In a further embodiment of any of the forgoing embodiments, the forward coating portion and the aft coating portion are approximately equivalent in area.

In a further embodiment of any of the forgoing embodiments, the distinct body is formed of metal.

In a further embodiment of any of the forgoing embodiments, the forward coating portion includes a first tapered section tapering axially toward the bare area and the aft coating portion includes a second tapered section tapering axially toward the bare area.

A blade outer air seal member according to an example of the present disclosure includes a distinct metal body including two circumferential sides, a leading edge and a trailing edge, and a gas path side and a radially outer side opposite the gas path side. A thermal barrier coating is disposed on a portion of the gas path side. The thermal barrier ceramic coating includes a first coating portion and a second coating portion. The gas path side has a bare area separating the first coating portion and the second coating portion. The bare area excludes any of the ceramic coating, and the first coating portion includes a first tapered section tapering axially toward the bare area.

In a further embodiment of any of the forgoing embodiments, the second coating portion includes a second tapered section tapering axially toward the bare area.

In a further embodiment of any of the forgoing embodiments, the first coating portion and the second coating portion each have a non-tapered section of uniform thickness.

In a further embodiment of any of the forgoing embodiments, the first tapered section begins tapering at an intermediate location between forward and aft sides of the first coating portion.

In a further embodiment of any of the forgoing embodiments, the second coating portion includes a second tapered section tapering axially toward the bare area, and the first tapered section and the second tapered section begin tapering at respective intermediate locations between forward and aft sides of, respectively, the first coating portion and the second coating portion.

In a further embodiment of any of the forgoing embodiments, the second coating portion includes a second tapered section tapering axially toward the bare area, the first coating portion and the second coating portion include, respectively, a first non-tapered section of uniform thickness and a second non-tapered section of uniform thickness, and the first tapered section and the second tapered section begin tapering from, respectively, the first non-tapered section and the second non-tapered section.

DETAILED DESCRIPTION

Figure 1:
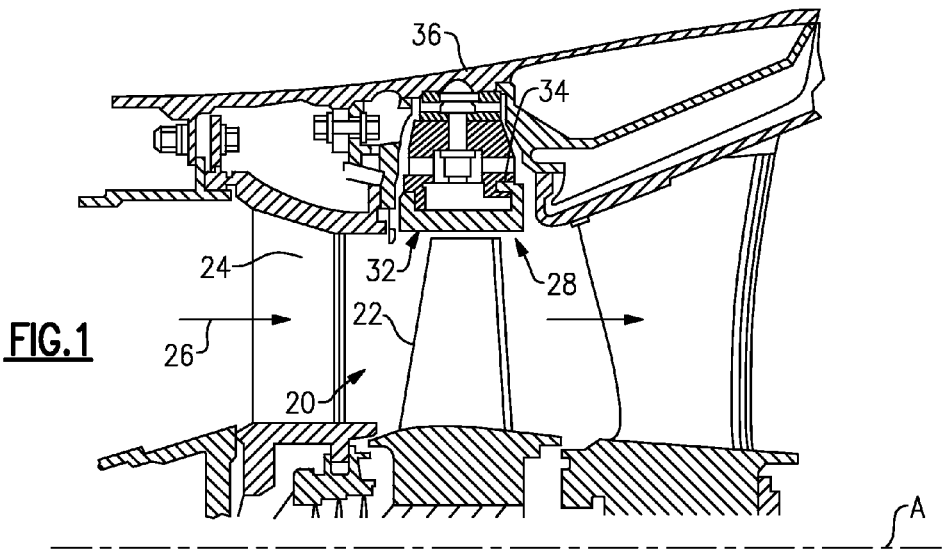
FIG. 1 illustrates an example turbine section.

FIG. 1 illustrates a selected portion of a turbine section 20 of a gas turbine engine. The gas turbine engine is of known arrangement and includes a compressor section, a combustion section and the turbine section 20. The turbine section 20 includes turbine blades 22 and turbine vanes 24.

The turbine blades 22 receive a hot gas flow 26 from the combustion section of the engine. The turbine section 20 includes a blade outer air seal system 28 having a blade outer air seal member 32 that functions as an outer wall for the hot gas flow 26 through the turbine section 20. In the disclosed example, the blade outer air seal member 32 is removably secured to a support 34 using L-shaped hooks or other attachment features. The support 34 is secured to a case 36 that generally surrounds the turbine section 20. The turbine section 20 is provided with a plurality of blade outer air seal members 32, or segments, that are circumferentially arranged about the turbine blades 22. The features of the blade outer air seal member 32 that will be described below with regard to the normal orientation of the blade outer air seal member 32 in the engine relative to a central axis A of the engine.

FIG. 1 is a schematic presentation to illustrate an example operating environment of the blade outer air seal member 32 and is not a limitation on the disclosed examples. Additionally, there are various types of gas turbine engines, many of which could benefit from the examples disclosed herein.

Figure 2:
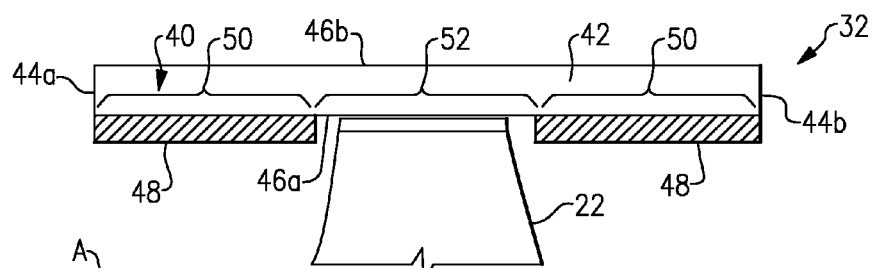
FIG. 2 illustrates an example blade outer air seal member having a partial ceramic coating.

FIG. 2 illustrates an example of the blade outer air seal member 32. In the illustration, the blade outer air seal member 32 is shown in a simplified view, without connection features or cooling passages that may be included. In this example, the blade outer air seal member 32 includes a body 40 that extends between two circumferential sides 42 (one shown), axially between a leading edge 44a and a trailing edge 44b, between a gas path side 46a and a radially outer side 46b opposite the gas path side 46a.

A coating 48 is initially disposed on a portion 50 of the gas path side 46a. The portion 50 is outside of a blade rub area 52 (i.e., surface) of the gas path side 46a. The blade rub area 52 is initially bare with regard to any of the coating 48. The blade rub area 52 optionally includes another type of types of non-ceramic or non-thermal barrier coatings (e.g., MCrAlY), but does not include a ceramic coating. That is, the blade rub area 52 is bare with, regard to any ceramic coating, prior to any contact with the tips of the blades 22 and is not bare from abrasion contact with the blades 22. For example, the blade rub area 52 is directly outboard of the tips of the blades 22 and rubs against the tips during a wear-in period of the blade outer air seal member 32. After the wear-in period, there is reduced or no contact between the tips and the blade rub area 52.

In the illustrated example, the coated portion 50 of the gas path side 46a includes a first area (to the left of the blade rub area 53 in the illustration) that extends along the leading edge 44a and a second area (to the right of the blade rub area 53 in the illustration) that extends along the trailing edge 44b. The blade rub area 52 separates the first area from the second area, although in other examples the portion 50 need not be divided. In a further example, the blade rub area 52 bisects the coated portion 50 such that the size of the first area is approximately equivalent to the size of the second area. It is to be understood that in other examples, the sizes of the first area and the second area need not be equal and the sizes may depend upon the particular design of the turbine section 20.

Figure 3:
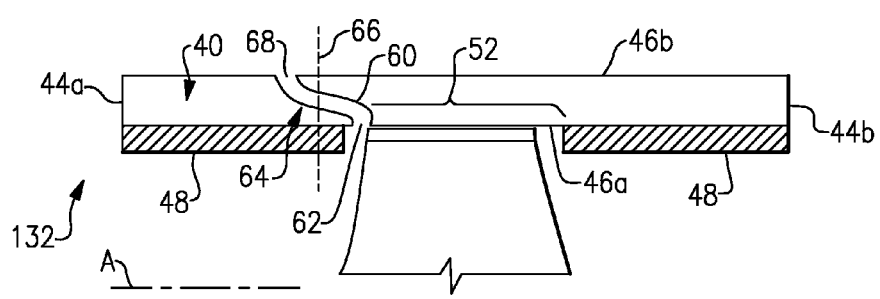
FIG. 3 illustrates another example blade outer air seal member having a partial ceramic coating and a cooling passage that extends under the coating.

FIG. 3 illustrates another example blade outer air seal member 132. In this disclosure, like reference numerals designate like elements where appropriate and reference numerals with the addition of a prime (') or a multiple of one-hundred designate modified elements. The modified elements are understood to incorporate the same features and benefits of the corresponding elements. In this example, the blade outer air seal member 132 is similar to the blade outer air seal member 32 shown in FIG. 2, but additionally includes a cooling passage 60 that extends within the body 40. The blade outer air seal member 132 may include multiple of such cooling passages 60. The cooling passage 60 has an outlet hole 62 that opens at the blade rub area 52. The cooling passage 60 extends in the body 40 in an axial direction relative to engine axis A such that a portion 64 of the cooling passage 60 is adjacent to the coating 48. In a further example, the portion 64 of the cooling passage 60 is axially aligned (i.e., at the same axial position), as represented at 66, with a part of the coating 48. That is, the cooling passage 60 in this example extends forward from the outlet hole 62 toward the leading edge 44a and underneath a portion of the coating 48. In this example, the cooling passage 60 has an inlet hole 68 on the radially outer side 46b of the blade outer air seal member 132.

In operation, the tips of the blades 22 extend into contact with the blade rub area 52 of the body 40. During the wear-in period, the tips rub against the blade rub area 52, or at least a portion thereof. After the wear-in period, the blade rub area 52 is exposed to high temperature combustion gases.

In use, the cooling fluid flowing through the cooling passage 60 enters through inlet hole 68 and travels through the portion 64 to the outlet hole 62. The cooling fluid that exits the outlet hole 62 provides a film of cooling fluid over the blade rub area 52 to help maintain the blade rub area 52 at a desired temperature. The routing of the cooling passage 60 under and adjacent the coating 48 also helps to maintain the coated portions 50 in the first area at a desirable temperature. Thus, the cooling passage 60 serves the dual purpose of helping to cool the coated areas as well as film cooling the blade rub area 52. The disclosed cooling passage 60 may therefore reduce the need for other cooling to the coated portions 50. For example, the coated portions 50 may be cooled through the use of film cooling holes that are located on the leading edge 44a (not shown).

With cycling of the engine between on and off conditions, or even between throttle levels, different amounts of heat are generated. The repeated heating and relative cooling of the blade rub area 52 causes the body 40 at the blade rub area 52 to thermally expand and contract. The cooling passage 60 is provided to maintain the blade rub area 52 at a desired temperature to reduce the effects of thermal expansion and contraction.

In comparison, a blade outer air seal member having a gas path side that is entirely coated with a ceramic thermal barrier coating is subject to wear against the tips of the blades during a wear-in period. The tips wear or spall away the ceramic coating in the blade rub area. With continued use, the ceramic coating can spall and expose the underlying bare metal to the high temperature combustion gases. With local exposure of the central portion of the BOAS, excessive temperatures and stresses can lead to early degradation of the segment. In areas outside of the blade rub area, less heat is generated. The difference in heat generation between the blade rub area and areas outside of the blade rub area cause thermal stress in the axial direction of the blade outer air seal member. The thermal stresses can cause cracking in the coating and/or in the underlying metal of the body. However, in the disclosed example where sufficient cooling is provided to the blade rub area 52 to account for there not being any of the coating 48, the heat from the high temperature combustion gases can be adequately removed to limit the effects of thermal expansion and contraction.

Figure 4A:
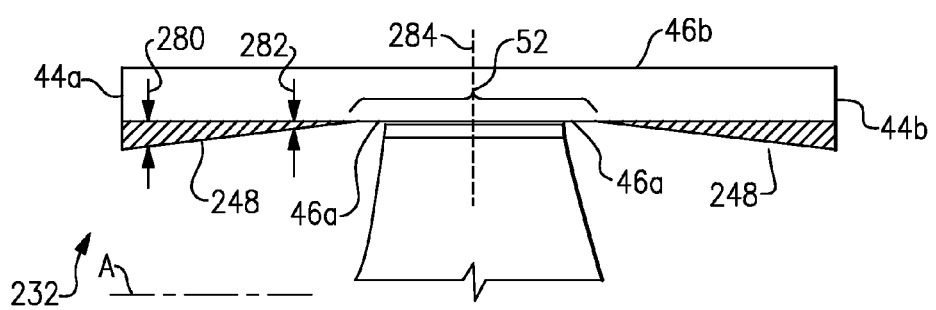
FIG. 4A illustrates another example blade outer air seal member that has a tapered ceramic coating.

FIG. 4A illustrates another embodiment blade outer air seal member 232. In this example, the blade outer air seal member 232 is similar to the blade outer air seal member 32 shown in FIG. 2, in which the coating 48 has a uniform thickness throughout. However, in this example, the blade outer air seal member 232 includes a coating 248 that tapers axially. As shown, the coating 248 is thicker at a first location 280 than at a second location 282 that is closer to an axial center 284 of the blade outer air seal member 232. For instance, the coating 248 is thickest at the leading edge 44a, the trailing edge 44b, or both and reduces in thickness as a function of distance from the axial center 284.

In the illustrated example, the coating 248 on the first area (to the left of the blade rub area 52 in the illustration) of the gas path side 46a tapers from the leading edge 44a to a zero thickness at a terminal edge of the coating along the blade rub area 52. Likewise, the coating 248 on the second area (to the right of the blade rub area 52 in the illustration) of the gas path side 46a tapers in thickness from the trailing edge 44b toward a zero thickness at a terminal edge of the coating 248 along the blade rub area 52. In a further example, the coating 284 tapers only over a partial axial length of the first area and/or the second area.

In operation, the tapered thickness of the coating 248 helps to reduce thermal mechanical fatigue of the coating 248 due to heat cycling and difference in temperature between the blade rub area 52 and the portions outside of the blade rub area 52 on which the coating 248 is disposed. That is, there is less of the coating 248 material near the blade rub area 52, which is the hottest portion of the blade outer air seal member 232.

Figure 4B:
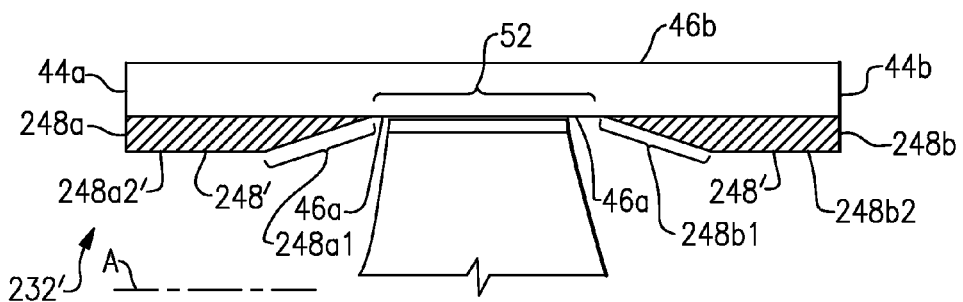
FIG. 4B illustrates another example blade outer air seal member that has a tapered ceramic coating.

FIG. 4B illustrates another example of a blade outer air seal member 232'. In this example, the coating 248' includes a first (or forward) coating portion 248a and a second (or aft) coating portion 248b. At least one of the first coating portion 248a and the second coating portion 248b tapers axially toward the bare, blade rub area 52. In this example, both the first coating portion 248a and the second coating portion 248b taper axially, although in other examples only one or the other could be tapered. Similar to the coating 248, the taper of the coating 248' facilitates the reduction of thermal mechanical fatigue. Optionally, in further examples, the blade outer air seal member 232' also includes one or more of the cooling passages 60 described above.

The first coating portion 248a includes a first tapered section 248a1 and the second coating portion 248b includes a second tapered section 248b1. The remainder of the first coating portion 248a (toward the leading edge 44a) is a first non-tapered section 248a2 of uniform thickness, and the remainder of the second coating portion 248b (toward the leading edge 44b) is a second non-tapered section 248b2 of uniform thickness. The first tapered section 248a1 and the second tapered section 248b begin tapering from the respective non-tapered sections 248a2/248b2, which are at locations that are intermediate the forward and aft sides of the respective coating portions 248a/248b.

Figure 5:
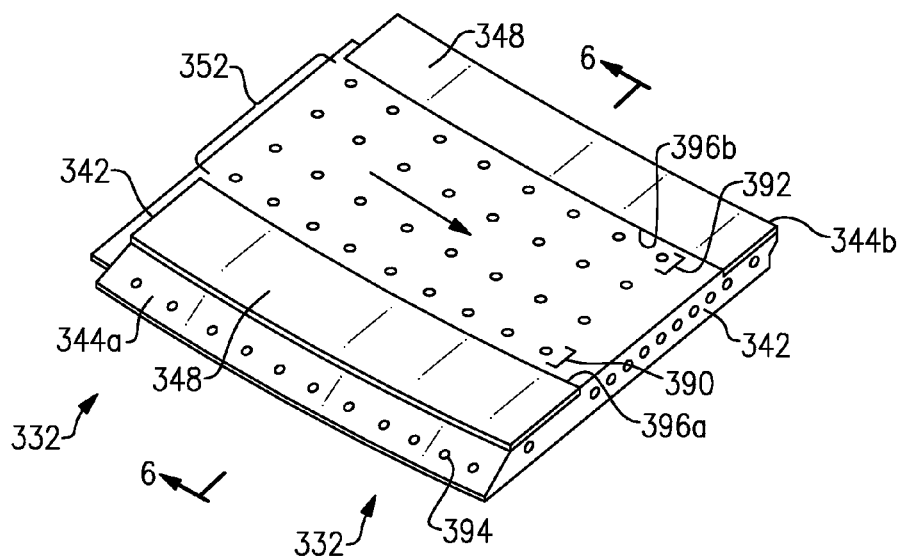
FIG. 5 illustrates an example blade outer air seal member that has a row of circumferential cooling holes.
Figure 6:
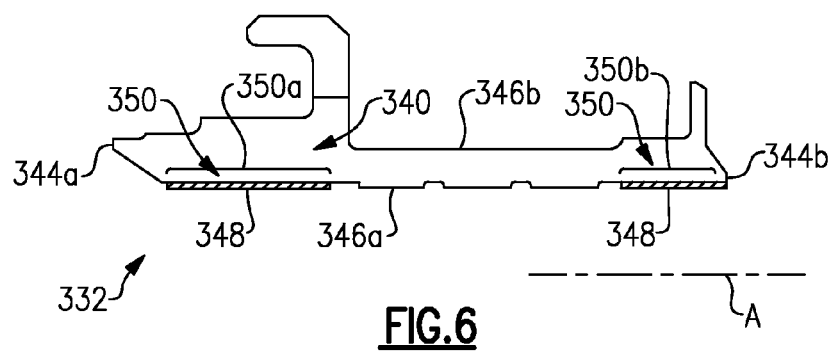
FIG. 6 is a cross-sectional view of the blade outer air seal member of FIG. 5.

FIG. 5 illustrates another example blade outer air seal member 332 in a perspective view and FIG. 6 illustrates the blade outer air seal member 332 in cross-section. In this example, the blade outer air seal member 332 includes a body 340 that extends between two circumferential sides 342, axially between a leading edge 344a and a trailing edge 344b, and between a gas path side 346a and a radially outer side 346b opposite the gas path side 346a.

The blade outer air seal member 332 includes a coating 348 that is disposed on a portion 350 of the gas path side 346a. In this example, part of the coating 348 is disposed on a first area 350a and another part of the coating 348 is disposed on a second area 350b. The areas 350a and 350b are separated by the blade rub area 352 such that the coating 348 is discontinuous on the gas path side 346a.

The blade outer air seal member 332 includes a row 390 of cooling holes that extend adjacent the coating 348 that is located on the leading edge 344a side of the blade outer air seal member 332. The cooling holes can extend under the coating 348, as shown in FIG. 3. As shown, the row 390 is located closer to the coating 348 that is on the first area 350a than to the coating 348 that is on the second area 350b. Optionally, another row 392 of cooling holes may be provided along the coating 348 that is on the second area 350b. However, in some examples, the row 392 is unnecessary because the cooling film emitted from the row 390 flows over the surface of the coating 348 on the second area 350b. The coating 348 on the first area 350a is cooled by cooling holes 394 in the leading edge 344a.

In the illustrated example, the row 390 of cooling holes is adjacent a terminal edge 396a of the coating 348 on the first area 350a. The other row 392 of cooling holes is adjacent a terminal edge 396b of the coating 348 on the second area 350b. For instance, each hole in the row 390 is an equivalent distance from the terminal edge 396a and each hole in the row 392 is an equivalent distance from the terminal edge 396b.

The cooling holes in the blade rub area 352 help to maintain the blade rub area 352 at a desirable temperature. The areas 350a and 350b outside of the blade rub area 352 are thermally protected by the coating 348 and therefore do not require as much cooling as the blade rub area 352. In that regard, the areas 350a and 350b outside of the blade rub area 352 do not include cooling holes. That is, some of the cooling that might otherwise have been used to cool the areas 350a and 350b outside of the blade rub area 352 may instead be used to cool the blade rub area 352 that does not include any coating thereon. Thus, the blade outer area seal member 332 embodies a method of establishing a greater amount of cooling to the bare blade rub area 352 than to the areas 350a and 350b that are coated by providing cooling holes on the blade rub area 352 but not on the coated areas 350a and 350b.

Whereas coatings that are normally used on gas path side surfaces of blade outer air seals must be abradable by having a certain porosity to allow the coating to wear away upon contact with the tips of the blades, the coatings disclosed herein do not contact the tips of the blades. There is therefore no need for the coatings to be abradable with a certain predetermined porosity. Thus, the porosity of the coatings disclosed herein may be reduced to substantially zero if desired, without regard to the abradability with the tips of the blades. Moreover, because the disclosed coatings are not in contact with the tips of the blades and see less heat, the composition of the coatings can be varied from compositions previously used. However, in a few examples, the coating is or includes a ceramic material, such as yttria stabilized zirconia, gadolinia stabilized zirconia, or combinations thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A blade outer air seal member comprising:
a distinct body including two circumferential sides, a leading edge and a trailing edge, and a gas path side and a radially outer side opposite the gas path side;
a ceramic coating initially disposed on a portion of the gas path side, the ceramic coating including a forward coating portion axially forward of a blade rub area for a row of blades and an aft coating portion axially aft of the blade rub area;
the gas path side having a bare area including the blade rub area and axially separating the forward coating portion and the aft coating portion, the bare area excluding any of the ceramic coating; and
at least one cooling passage having an outlet that opens at the bare area, the at least one cooling passage extending in the distinct body in an axial direction under the ceramic coating.

2. The blade outer air seal member as recited in claim 1, wherein the at least one cooling passage includes an inlet that opens at the radially outer side.

3. The blade outer air seal member as recited in claim 2, wherein the inlet is axially offset from the outlet.

4. The blade outer air seal member as recited in claim 3, wherein the inlet is axially forward of the outlet with respect to the leading edge.

5. The blade outer air seal member as recited in claim 1, wherein the outlet is located closer to the forward coating portion than to the aft coating portion.

6. The blade outer air seal member as recited in claim 1, wherein the body is monolithic.

7. The blade outer air seal member as recited in claim 1, wherein the at least one cooling passage radially slopes.

8. The blade outer air seal member as recited in claim 1, wherein the forward coating portion and the aft coating portion are approximately equivalent in area.

9. The blade outer air seal member as recited in claim 1, wherein the distinct body is formed of metal.

10. The blade outer air seal member as recited in claim 1, wherein the forward coating portion includes a first tapered section tapering axially toward the bare area and the aft coating portion includes a second tapered section tapering axially toward the bare area.

11. The blade outer air seal member as recited in claim 1, wherein multiple cooling passages have outlets that open at the bare area, and the outlets are arranged in multiple circumferential rows.

12. The blade outer air seal member as recited in claim 1, wherein the bare area is a metal surface and is an exclusive bare area on the gas path side.

13. The blade outer air seal member as recited in claim 10, wherein the first tapered section and the second tapered section begin tapering at respective intermediate locations between forward and aft sides of, respectively, the forward coating portion and the aft coating portion.

14. A blade outer air seal member comprising:
a distinct metal body including two circumferential sides, a leading edge and a trailing edge, and a gas path side and a radially outer side opposite the gas path side;
a thermal barrier ceramic coating disposed on a portion of the gas path side, the thermal barrier ceramic coating including a first coating portion and a second coating portion; and
the gas path side having a bare area separating the first coating portion and the second coating portion, the bare area excluding any of the ceramic coating, and the first coating portion including a first tapered section tapering axially toward the bare area; and
the second coating portion includes a second tapered section tapering axially toward the bare area.

15. The blade outer air seal member as recited in claim 14, wherein the first coating portion and the second coating portion each have a non-tapered section of uniform thickness.

16. The blade outer air seal member as recited in claim 14, wherein the first tapered section begins tapering at an intermediate location between forward and aft sides of the first coating portion.

17. The blade outer air seal member as recited in claim 14, wherein the bare area is a surface of the distinct metal body.

18. A blade outer air seal member comprising:
a distinct metal body including two circumferential sides, a leading edge and a trailing edge, and a gas path side and a radially outer side opposite the gas path side;
a thermal barrier ceramic coating disposed on a portion of the gas path side, the thermal barrier ceramic coating including a first coating portion and a second coating portion; and
the gas path side having a bare area separating the first coating portion and the second coating portion, the bare area excluding any of the ceramic coating, and the first coating portion including a first tapered section tapering axially toward the bare area;
wherein the second coating portion includes a second tapered section tapering axially toward the bare area, and the first tapered section and the second tapered section begin tapering at respective intermediate locations between forward and aft sides of, respectively, the first coating portion and the second coating portion.

19. The blade outer air seal member as recited in claim 18, wherein the first coating portion and the second coating portion include, respectively, a first non-tapered section of uniform thickness and a second non-tapered section of uniform thickness, and the first tapered section and the second tapered section begin tapering from, respectively, the first non-tapered section and the second non-tapered section.

* * * * *